United States Patent
Jiang et al.

(10) Patent No.: US 11,106,991 B2
(45) Date of Patent: Aug. 31, 2021

(54) TECHNIQUES FOR UNIVERSAL QUANTUM CONTROL OF QUANTUM COHERENT STATES AND RELATED SYSTEMS AND METHODS

(71) Applicant: Yale University, New Haven, CT (US)

(72) Inventors: Liang Jiang, Guilford, CT (US); Robert J. Schoelkopf, III, Madison, CT (US); Michel Devoret, New Haven, CT (US); Victor V. Albert, New Haven, CT (US); Stefan Krastanov, New Haven, CT (US); Chao Shen, New Haven, CT (US)

(73) Assignee: Yale University, New Haven, CT (US)

( * ) Notice: Subject to any disclaimer, the term of this patent is extended or adjusted under 35 U.S.C. 154(b) by 919 days.

(21) Appl. No.: 15/553,047

(22) PCT Filed: Feb. 26, 2016

(86) PCT No.: PCT/US2016/019807
§ 371 (c)(1),
(2) Date: Aug. 23, 2017

(87) PCT Pub. No.: WO2016/138399
PCT Pub. Date: Sep. 1, 2016

(65) Prior Publication Data
US 2018/0032895 A1 Feb. 1, 2018

Related U.S. Application Data

(60) Provisional application No. 62/126,384, filed on Feb. 27, 2015.

(51) Int. Cl.
*G06N 10/00* (2019.01)
*H04B 10/70* (2013.01)

(52) U.S. Cl.
CPC ............ *G06N 10/00* (2019.01); *H04B 10/70* (2013.01)

(58) Field of Classification Search
CPC ..................................................... G06N 10/00
See application file for complete search history.

(56) References Cited

U.S. PATENT DOCUMENTS

| 6,578,018 B1 | 6/2003 | Ulyanov |
| 6,635,898 B2 | 10/2003 | Williams et al. |

(Continued)

FOREIGN PATENT DOCUMENTS

| CN | 1991558 A | 7/2007 |
| CN | 101076957 A | 11/2007 |

(Continued)

OTHER PUBLICATIONS

Wendin et al., Superconducting Quantum Circuits, Qubits and Computing, pp. 1-60, Aug. 2005. (Year: 2005).*

(Continued)

*Primary Examiner* — Kamran Afshar
*Assistant Examiner* — Marshall L Werner
(74) *Attorney, Agent, or Firm* — Wolf, Greenfield & Sacks, P.C.

(57) ABSTRACT

Some aspects are directed to a method of operating an apparatus, the apparatus comprising a first quantum system having a plurality of coherent quantum states, the first quantum system being coupled to a second quantum system, the method comprising providing an input energy signal to the second quantum system that stimulates energy transfer between the first quantum system and the second quantum system and that causes net dissipation of energy to be output from the second quantum system, wherein the input energy signal includes at least two components having different frequencies and each having an amplitude and a phase, and (Continued)

adiabatically varying the amplitude and the phase of the at least two components of the input energy signal to cause a change in one or more of the plurality of coherent quantum states of the first quantum system.

17 Claims, 7 Drawing Sheets

(56) References Cited

U.S. PATENT DOCUMENTS

| | | | |
|---|---|---|---|
| 6,943,368 | B2 | 9/2005 | Amin et al. |
| 7,230,266 | B2 | 6/2007 | Hilton et al. |
| 7,498,832 | B2 | 3/2009 | Baumgardner et al. |
| 7,899,092 | B2 | 3/2011 | Malinovsky |
| 8,106,717 | B2 | 1/2012 | Ichimura et al. |
| 8,138,784 | B2 | 3/2012 | Przybysz et al. |
| 8,242,799 | B2 | 8/2012 | Pesetski et al. |
| 8,508,280 | B2 | 8/2013 | Naaman et al. |
| 8,514,478 | B1 | 8/2013 | Spence |
| 10,540,602 | B2 | 1/2020 | Heeres et al. |
| 10,776,709 | B2 | 9/2020 | Shen et al. |
| 2002/0188578 | A1 | 12/2002 | Amin et al. |
| 2004/0109631 | A1 | 6/2004 | Franson et al. |
| 2004/0119061 | A1 | 6/2004 | Wu et al. |
| 2004/0200949 | A1 | 10/2004 | Beausoleil et al. |
| 2005/0240311 | A1 | 10/2005 | Rabitz |
| 2006/0017992 | A1 | 1/2006 | Beausoleil, Jr. et al. |
| 2006/0056631 | A1 | 3/2006 | Beausoleil et al. |
| 2009/0033369 | A1 | 2/2009 | Baumgardner et al. |
| 2012/0002968 | A1 | 1/2012 | Luo et al. |
| 2012/0319085 | A1 | 12/2012 | Gambetta et al. |
| 2012/0319684 | A1 | 12/2012 | Gambetta et al. |
| 2013/0196855 | A1 | 8/2013 | Poletto et al. |
| 2013/0308956 | A1 | 11/2013 | Meyers et al. |
| 2014/0266406 | A1 | 9/2014 | Abraham et al. |
| 2014/0314419 | A1* | 10/2014 | Paik ............... B82Y 10/00 398/115 |
| 2015/0263736 | A1 | 9/2015 | Herr et al. |
| 2016/0077168 | A1 | 3/2016 | Teklemariam et al. |
| 2016/0233965 | A1 | 8/2016 | Medford |
| 2016/0308502 | A1 | 10/2016 | Abdo et al. |
| 2016/0328659 | A1 | 11/2016 | Mohseni et al. |
| 2016/0364653 | A1 | 12/2016 | Chow et al. |
| 2017/0018312 | A1 | 1/2017 | Benjamin et al. |
| 2017/0076787 | A1 | 3/2017 | Frank |
| 2017/0193388 | A1 | 7/2017 | Filipp et al. |
| 2017/0201224 | A1 | 7/2017 | Strong et al. |
| 2018/0247217 | A1 | 8/2018 | Heeres et al. |
| 2019/0087743 | A1 | 3/2019 | Heeres et al. |
| 2019/0266512 | A1 | 8/2019 | Shen et al. |

FOREIGN PATENT DOCUMENTS

| | | |
|---|---|---|
| CN | 101990742 A | 3/2011 |
| CN | 102210908 A | 10/2011 |
| CN | 102593694 A | 7/2012 |
| CN | 103582949 A | 2/2014 |
| CN | 103998965 A | 8/2014 |
| EP | 2 797 038 A2 | 10/2014 |
| JP | 2007-524815 A | 8/2007 |
| JP | 2018-511848 A | 4/2018 |
| WO | WO 2008/140290 A2 | 11/2008 |
| WO | WO 2016/138378 A1 | 9/2016 |
| WO | WO 2016/138399 A1 | 9/2016 |
| WO | WO 2017/151200 A1 | 9/2017 |
| WO | WO 2018/089850 A1 | 5/2018 |

OTHER PUBLICATIONS

Mirrahimi et al., Dynamically Protected Cat-qubits: A New Paradigm for Universal Quantum Computing, pp. 1-28, Dec. 2013. (Year: 2013).*

Liu et al., Optical Selection Rules and Phase-Dependent Adiabatic State Control in a Superconducting Quantum Circuit, Physical Review Letters 95, 087001, pp. 1-4, Aug. 2005. (Year: 2005).*
EP17869543.3, Jun. 9, 2020, Extended European Search Report.
International Search Report and Written Opinion for International Application No. PCT/US2019/012440, dated Jul. 29, 2019.
Extended European Search Report dated Oct. 5, 2018 in connection with European Application No. 16756442.6.
Kirchmair et al., Observation of quantum state collapse and revival due to the single-photon Kerr effect. Nature. Mar. 14, 2013; 495 (7440): 205-09.
Schuster et al., Resolving photon number states in a superconducting circuit. Nature Letters. Feb. 1, 2007; 445: 515.
U.S. Appl. No. 16/348,131, filed May 7, 2019, Shen.
EP16756458.2, Nov. 12, 2018, Extended European Search Report.
EP16855886.4, Feb. 22, 2019, Extended European Search Report.
U.S. Appl. No. 15/552,998, filed Aug. 23, 2017, Heeres.
PCT/US2016/019769, May 5, 2016, International Search Report and Written Opinion.
PCT/US2016/019769, Sep. 8, 2017, International Preliminary Report on Patentability.
PCT/US2016/019807, May 2, 2016, International Search Report and Written Opinion.
PCT/US2016/019807, Sep. 8, 2017, International Preliminary Report on Patentability.
PCT/US2016/043514, May 23, 2017, International Search Report and Written Opinion.
PCT/US2016/043514, Feb. 8, 2018, International Preliminary Report on Patentability.
PCT/US2017/061181, Dec. 22, 2017, Invitation to Pay Additional Fees.
PCT/US2017/061181, Feb. 23, 2018, International Search Report and Written Opinion.
Extended European Search Report for European Application No. 17869543.3, dated Jun. 9, 2020.
Lloyd et al., Engineering quantum dynamics Phys Rev A. Dec. 10, 2001;65(1):010101.
The relevance of CN 1991558 A can be understood by its English language abstract.
The relevance of CN 101076957 A can be understood by its English language abstract.
The relevance of CN 101990742 A can be understood by its English language abstract.
The relevance of CN 102210908 A can be understood by its English language abstract.
The relevance of CN 102593694 A can be understood by its English language abstract.
The relevance of CN 103998965 A can be understood by its English language abstract.
The relevance of JP 2007-524815 A can be understood by its English language abstract.
PCT/US2019/012440, Jul. 29, 2019, International Search Report and Written Opinion.
International Search Report and Written Opinion for International Application No. PCT/US2016/019769 dated May 5, 2016.
International Preliminary Report on Patentability for International Application No. PCT/US2016/019769 dated Sep. 8, 2017.
International Search Report and Written Opinion for International Application No. PCT/US2016/019807 dated May 2, 2016.
International Preliminary Report on Patentability for International Application No. PCT/US2016/019807 dated Sep. 8, 2017.
International Search Report and Written Opinion for Application No. PCT/US2016/43514 dated May 23, 2017.
International Preliminary Report on Patentability for Application No. PCT/US2016/043514 dated Feb. 8, 2018.
Invitation to Pay Additional Fees for International Application No. PCT/US2017/061181 dated Dec. 22, 2017.
International Search Report and Written Opinion for International Application No. PCT/US2017/061181 dated Feb. 23, 2018.
Wendin et al., Superconducting quantum circuits, qubits and computing. Aug. 30, 2005. http://qudev.phys.ethz.ch/content/courses/QSIT08/pdfs/WendinReview.pdf, 60 pages.

(56) References Cited

OTHER PUBLICATIONS

Zueco et al., Qubit-oscillator dynamics in the dispersive regime: analytical theory beyond rotating wave approximation. Physical Review A. Jul. 20, 2009;80.3;1-6.
EP 16756442.6, Oct. 5, 2018, Extended European Search Report.
International Preliminary Report on Patentability for International Application No. PCT/US2017/061181 dated May 23, 20119.
Extended European Search Report for European Application No. 16756458.2 dated Nov. 12, 2018.
Extended European Search Report for European Application No. 16855886.4, dated Feb. 22, 2019.
Aharonov et al., Phase Change During a Cyclic Quantum Evolution, Phys. Rev. Lett. Apr. 20, 1987;58(16):1593-6.
Albert et al., Symmetries and conserved quantities in Lindblad master equations. Phys. Rev. A. Feb. 21, 2014;89(2):022118-1-14.
Andersson et al., Binary search trees for generalized measurements. Phys. Rev. A. May 6, 2008;77(5):052104-1-5.
Barreiro et al., An Open-System Quantum Simulator with Trapped Ions. Nature. Feb. 24, 2011;470:486-91.
Beige et al., Quantum Computing Using Dissipation to Remain in a Decoherence-Free Subspace. Phys. Rev. Lett. Aug. 21, 2000;85(8):1762-5.
Bianchetti et al., Dynamics of dispersive single qubit read-out in circuit quantum. electrodynamics Phys. Rev. A. Oct. 30, 2009;80(4):043840-1-7.
Blais et al., Cavity quantum electrodynamics for superconducting electrical circuits:An architecture for quantum computation. Phys. Rev. A. Jun. 29, 2004;69(6):062320-1-14.
Brattke et al., Generation of Photon Number States on Demand via Cavity Quantum Electrodynamics Phys. Rev. Lett. Apr. 16, 2001;86(16):3534-7.
Braunstein et al., Quantum information with continuous variables. Rev. Mod. Phys. Apr. 2005;77, 513-77.
Burgath et al., Non-Abelian phases from quantum Zeno dynamics Phys. Rev. A. Oct. 9, 2013;88(4), 042107-1-5.
Cacheffo et al., Quasi-perfect state transfer in a bosonic dissipative network. J. Phys. B:At. Mol. Opt. Phys. May 5, 2010;43(10):105503.
Cafaro et al., Quantum stabilizer codes embedding qubits into qudits. Phys. Rev. A. Aug. 2012;86(2):022308.
Carollo et al., Coherent quantum evolution via reservoir driven holonomy. Phys. Rev. Lett. Jan. 20, 2006;96(2):020403-1-4.
Carollo et al., Geometric phase induced by a cyclically evolving squeezed vacuum reservoir. Phys. Rev. Lett. Apr. 21, 2006;96(15):150403-1-4.
Chaturvedi et al., Berry's phase for coherent states. J. Phys. A:Math. Gen. Nov. 11, 1987;20(16):L1071-5.
Choi, Completely positive linear maps on complex matrices. Linear Algebra and Its Applications. Jun. 1, 1975;10(3):285-90.
Dasgupta et al., Decoherence-induced geometric phase in a multilevel atomic system. J. Phys. B:At. Mol. Opt. Phys. May 14, 2007;40(9):S127.
De Oliveira et al., Properties of displaced No. states. Phys. Rev. A. Mar. 1, 1990;41(5):2645-52.
De Ponte et al., Relaxation- and decoherence-free subspaces in networks of weakly and strongly coupled resonators. Ann. Phys. Sep. 2007;322(9):2077-84.
De Ponte et al., State protection under collective damping and diffusion. Phys. Rev. A. Jul. 26, 2011;84(1):012331-1-5.
De Ponte et al., Storing quantum states in bosonic dissipative networks. J. Phys. B:At. Mol. Opt. Phys. Nov. 14, 2008;41(21):215506.
Deléglise et al., Reconstruction of non-classical cavity field states with snapshots of their decoherence. Nature. Sep. 25, 2008;455(7212):510-4.
Devoret et al., Superconducting Circuits for Quantum Information:An Outlook. Science. Mar. 8, 2013;339(6124):1169-74.
Divincenzo, Quantum Computation. Science. Oct. 13, 1995;270(5234):255-61.
Dodonov et al., Even and Odd Coherent States and Excitations of a Singular Oscillator. Physica. Mar. 15, 1974;72(3):597-615.

Duan et al., Preserving coherence in quantum computation by pairing the quantum bits. Phys. Rev. Lett. Sep. 8, 1997;79(10):1953-6.
Facchi et al., Quantum Zeno Subspaces. Physical Review Letters. Aug. 19, 2002;89(8):080401-1-4.
Feng et al., Geometric Entangling Gates in Decoherence-Free Subspaces with Minimal Requirements. Phys. Rev Lett. Nov. 13, 2009;103(20):200501-1-4.
Fouquieres et al., Second order gradient ascent pulse engeineering. J. Mag. Res. Oct. 2011;212(2):412-7.
Gambetta et al., Qubit-photon intereactions in a cavity:Measurement-induced dephasing and number splitting. Phys. Rev. A. Oct. 17, 2006;74(4):042318-1-14.
Gorini et al., Completely positive dynamical semigroups of N-level systems. J. Math. Phys. May 1976;17(5):821-5.
Gottesman et al., Encoding a qubit in an oscillator. Phys. Rev. A. Jul. 2001;64(1):012310-1-21.
Heeres et al., Cavity State Manipulation Using Photon-Number Selective Phase Gates. Phys. Rev Lett Sep. 25, 2015;115(13):137002-1-5. arXiv:1503.01496v1.
Hofheinz et al., Generation of Fock states in a superconducting quantum circuit. Nature. Jul. 17, 2008;454(7202):310-4.
Hofheinz et al., Synthesizing arbitrary quantum states in a superconducting resonator. Nature. May 28, 2009;459(7246):546-9.
Houck et al., Generating single microwave photons in a circuit. Nature. Sep. 20, 2007;449(7160):328-31.
Johnson et al., Quantum non-demolition detection of single microwave photons in a circuit. Nature Phys. Jun. 20, 2010;6:663-7.
Kapit, Error-Transparent Quantum Gates for Small Logical Qubit Architectures. Physical. Review Letters. Feb. 1, 2018;120(5):050503-1-5.
Kempe et al., Theory of decoherence-free fault-tolerant universal quantum computation. Phys. Rev. A. Apr. 2001;63(4):042307-1-29.
Knill et al., Theory of Quantum Error Correction for General Noise. Phys. Rev, Lett. Mar. 13, 2000;84(11):2525-8.
Krastanov et al., Universal Control of an Oscillator with Dispersive Coupling to a Qubit. Phys. Rev. A. Oct. 21, 2015;92(4):040303-1-5.
Lanyon et al., Universal Digital Quantum Simulation with Trapped Ions. Science. Oct. 7, 2011;334(6052):57-61.
Law et al., Arbitrary Control of a Quantum Electromagnetic Field. Phys. Rev. Lett. Feb. 12, 1996;76(7):1055-8.
Leek et al., Observation of Berry's Phase in a Solid-State Qubit. Science. Dec. 21, 2007;318(5858):1889-92.
Leghtas et al., Confining the state of light to a quantum manifold by engineered two-photon loss. Science. Feb. 20, 2015;347(6224):853-7.
Leghtas et al., Deterministic protocol for mapping a qubit to coherent state superpositions in a cavity. Phys. Rev. A. Apr. 15, 2013;87(4):042315-1-7.
Leghtas et al., Hardware-Efficient Autonomous Quantum Memory Protection. Phys Rev Lett. Sep. 20, 2013;111(12):120501-1-5.
Leibfried et al., Quantum dynamics of single trapped ions. Rev. Mod. Phys. Jan. 2003;75(1):281-324.
Liang et al., Nonadiabatic holonomic quantum computation in decoherence-free subspaces with trapped ions. Phys. Rev. A. Jun. 10, 2014;89(6):062312-1-5.
Lidar et al., Decoherence Free Subspaces for Quantum Computation. Phys. Rev. Lett. Sep. 21, 1998;81(12):2594-7.
Lindblad, On the Generators of Quantum Dynamical Semigroups. Commun. Math. Phys. Jun. 1976;48(2):119-30.
Lloyd et al., Quantum Computation over Continuous Variables. Phys. Rev. Lett. Feb. 22, 1999;82(8):1784-7.
Michael et al., New Class of Quantum Error-Correcting Codes for Bosonic Mode, Phys. Rev. X. Jul.-Sep. 2016:6(3):031006-1-26.
Mirrahimi et al., Dynamically protected cat-qubits:a new paradigm for universal quantum computation. New Journal of Physics. Apr. 2014;16(4):045014. doi:10.1088/1367-2630/16/4/045014. 30 pages.
Mischuck et al., Qudit quantum computation in the Jaynes-Cumming model. Phys. Rev. A. Feb. 2013;87(2):022341-1-14.
Mousolou et al., Universal non-adiabatic holonomic gates in quantum dots and single-molecule magnets. New J. Phys. Jan. 17, 2014;16:013029.

(56) References Cited

OTHER PUBLICATIONS

Neto et al., From decoherence-free channels to decoherence-free and quasi-free subspaces within bosonic dissipative networks. J. Phys. B:At. Mol. Opt. Phys. Jul. 5, 2011;44(14):145502.
Nigg et al., Quantum computations on a topolgically encoded qubit. Science. Jul. 18, 2014;345(6194):302-5.
Oreshkov et al., Adiabatic Markovian Dynamics Phys. Rev. Lett. Jul. 30, 2010;105(5):050503.
Oreshkov et al., Fault-Tolerant Holonomic Quantum Computation. Phys. Rev. Lett. Feb. 20, 2009;102(7):070502-1-4.
Osaki et al., Derivation and physical interpretation of the optimum detection operators for coherent-state signals. Phys. Rev. A. Aug. 1996;54(2):1691-1701.
Pachos et al., Decoherence-free dynamical and geometrical entangling phase gates. Phys. Rev. A Mar. 26, 2004;69(3):033817-1-9.
Palomaki et al., Coherent state transfer between itinerant microwave fields and a mechanical oscillator. Nature. Mar. 14, 2013. 495(7440):210-4.
Paz-Silva et al., Zeno effect for quantum computation and control. Physical Review Letters. Feb. 24, 2012;108(8):080501-1-5.
Poyatos et al., Quantum Reservoir Engineering with Laser Cooled Trapped Ions. Phys. Rev. Lett. Dec. 2, 1996;77(23):4728-31.
Reagor et al., Reaching 10 ms single photon lifetimes for superconducting aluminum cavities. Appl. Phys. Lett. May 13, 2013:102(19):192604.
Recati et al., Holonomic quantum computation with neutral atoms. Physical Review A. Sep. 17, 2002;66(3):032309-1-13. doi:10.1103/PHYSREVA.66.032309. 14 pages.
Reiserer et al., A quantum gate between a flying optical photon and a single trapped atom. Nature. Apr. 10, 2014;508(7495):237-40.
Rosenblum et al., Fault-tolerant measurement of a quantum error syndrome. Science. Jul. 20, 2018;361(6399):266-70.
Salathe et al., Digital Quantum Simulation of Spin Models with Circuit Quantum. Electrodynamics Phys. Rev. X 5. Apr.-Jun. 2015;5(2):021027-1-12.
Sarandy et al., Abelian and non-Abelian geometric phases in adiabatic open quantum systems. Phys. Rev. A. Jun. 5, 2006;73(6):062101-1-10.
Schindler et al., Quantum simulation of open-system dynamical maps with trapped ions. Nat. Phys. May 19, 2013;9:361-7.
Schoelkopf et al., Wiring up quantum systems. Nature. Feb. 7, 2008;451(7179):664-9.
Shankar et al., Autonomously stabilized entanglement between two superconducting quantum bits. Nature. Dec. 19, 2013;504(7480):419-22.
Shen et al., Quantum channel construction with circuit quantum electrodynamics Phys Rev B. Apr. 1, 2017;95(13):134501-1-14. arXiv:1611.03463
Signoles et al., Confined quantum Zeno dynamics of a watched atomic arrow. Nature Phys. Oct. 2014;10:715-9.
Sjöqvist, A new phase in quantum computation. Physics. Nov. 17, 2008;1:35.
Smolin et al., Efficient Method for Computing the Maximum-Likelihood Quantum State from Measurements with Additive Gaussian Noise Phys. Rev. Lett. Feb. 17, 2012;108(7):070502-1-4.
Tiecke et al., Nanophotonic quantum phase switch with a single atom. Nature. Apr. 10, 2014;508(7495):241-4.
Vlastakis et al., Deterministically Encoding Quantum Information Using 100-Photon Schrodinger Cat States. Science. Nov. 1, 2013;342(6158):607-10.
Vourdas, Quantum systems with finite Hilbert space. Rep. Prog. Phys. Mar. 2004:67(3):267-320.
Wallraff et al., Strong coupling of a single photon to a superconducting qubit using circuit quantum electrodynamics Nature. Sep. 9, 2004;431(7005):162-7.
Whitney et al., Automated generation of layout and control for quantum circuits. CF '07. Proceedings of the 4th International Conference on Computing Frontiers. May 7-9, 2007:83-94.

Wilczek et al., Appearance of Gauge Structure in Simple Dynamical Systems. Phys. Rev. Lett. Jun. 10, 1984;52(24):2111-4.
Wu et al., Holonomic Quantum Computation in Decoherence-Free Subspaces. Phys. Rev. Lett. Sep. 25, 2005:95(13):130501-1-4.
Wu et al., Time-dependent Decoherence-Free Subspace. J. Phys. A:Math. Theor. Oct. 12, 2012;45(40):405305-1-7.
Xu et al., Non-Adiabatic Holonomic Quantum Computation in Decoherence-Free Subspaces. Phys. Rev, Lett. Oct. 26, 2012;109(17):170501-1-5.
Xu et al., Universal Nonadiabatic Geometric Gates in Two-Qubit Decoherence-Free Subspaces. Sci. Rep. Oct. 29, 2014;4:6814.
Yin et al., Implementation of holonomic quantum computation through engineering and manipulating environment. Physical Review A. Dec. 18, 2007;76(6):062311-1-5. doi:10.1103/Physreva.76.062311.
Zanardi et al., Coherent quantum dynamics in steady-state manifolds of strongly dissipative systems. Phys. Rev. Lett. Dec. 12, 2014;113(24):240406-1-5.
Zanardi et al., Geometry, robustness, and emerging unitarity in dissipation-projected dynamics Phys. Rev. A. May 26, 2015;91(5):052324-1-8.
Zanardi et al., Holonomic Quantum Computation. Phys. Lett. A. Dec. 20, 1999;264(2-3), 94-9.
Zanardi et al., Noiseless Quantum Codes. Phys. Rev. Lett. Oct. 27, 1997;79(17):3306-9.
Zanardi, Stablizing Quantum Information. Phys. Rev. A. Jan. 2001;63(1):012301-1-4.
Zanardi, Virtual Quatum Subsystems. Phys. Rev. Lett. Aug. 13, 2001;87(7):077901-1-4.
Zhang et al., Physical implementation of holonomic quantum computation in decoherence-free subspaces with trapped ions. Phys. Rev. A. Sep. 13, 200;74(3):034302-1-4.
Zhang et al., Quantum computation in noiseless subsystems with fast non-Abelian holonomies. Phys. Rev. A. Apr. 2014;89(4):042302-1-6.
Zheng, Dissipation-induced geometric phase for an atom trapped in an optical vacity. Phys. Rev. A. May 10, 2012;85(5):052106-1-5.
Zheng, Open-system geometric phase based on system-reservoir joint state evolution. Phys. Rev. A. Jun. 27, 2014;89(6):062118-1-6.
Zhu et al., Geometric quantum gates robust against stochastic control errors. Phys. Rev. A. Aug. 15, 2005;72(2):020301-1-4.
PCT/US2017/061181, May 23, 2019, International Preliminary Report on Patentability.
International Preliminary Report on Patentability for International Application No. PCT/US2019/012440, dated Jul. 16, 2020.
Slichter et al., Measurement-induced qubit state mixing in circuit QED from up-converted dephasing noise. Physical Review Letters. Oct. 9, 2012;109(15):153601.
U.S. Appl. No. 16/959,184, filed Jun. 30, 2020, Jiang et al.
PCT/US2019/012440, Jul. 16, 2020, International Preliminary Report on Patentability.
U.S. Appl. No. 15/747,260, filed Jan. 24, 2018, Heeres.
U.S. Appl. No. 16/959,187, filed Jun. 30, 2020, Jiang et al.
Ofek et al., Extending the lifetime of a quantum bit with error correction in superconducting circuits. Nature. Aug. 2016;536(7617):441.
Egger, Optimal control and quantum simulations in superconducting quantum devices. Universitat des Saarlandes Dissertation. Oct. 3, 2014:1-157.
Fisher et al., Optimal control of circuit quantum electrodynamics in one and two dimensions. Physical Review B. Feb. 2, 2010;81(8):085328.
Koch et al., Charge-insensitive qubit design derived from the Cooper pair box. Physical Review A. Oct. 1, 2007;76(4):042319.
Sheldon et al., Procedure for systematically tuning up cross-talk in the cross-resonance gate. Physical Review A. Jun. 2, 2016;93(6):060302.

\* cited by examiner

TECHNIQUES FOR UNIVERSAL QUANTUM CONTROL OF QUANTUM COHERENT STATES AND RELATED SYSTEMS AND METHODS

CROSS-REFERENCE TO RELATED APPLICATIONS

This application is the national phase filing under 35 U.S.C. § 371 of International Application No. PCT/US2016/019807, filed on Feb. 26, 2016, which claims priority to U.S. Provisional Patent Application No. 62/126,384, filed on Feb. 27, 2015, each of which are incorporated herein by reference to the maximum extent allowable.

FEDERALLY SPONSORED RESEARCH

This invention was made with government support under W911NF-14-1-011 awarded by the Army Research Office, government support under FA9550-14-1-0052 and FA9550-15-1-0015 awarded by the Air Force Office of Scientific Research, government support under W31P4W-12-1-0017 awarded by the Defense Advanced Research Projects Agency, and government support under 1122492 awarded by the National Science Foundation. The government has certain rights in the invention.

FIELD

The present application relates generally to quantum information processing. More specifically, the present application relates to quantum control of a system having a number of coherent quantum states.

BACKGROUND

The ability to prepare and control the quantum state of a quantum system is important for quantum information processing. Just as a classical computer memory should have the ability to initialize bits and implement gates to change the state of a bit from zero to one and vice versa, a quantum computer should be able to initialize the state of the quantum system used to store quantum information and to implement logical gates that change the state of the quantum system.

Quantum information may be stored in any of a variety of quantum mechanical systems. Conventionally, quantum information may be stored using quantum bits, referred to as "qubits," which are typically two-state quantum mechanical systems. However, many-state quantum systems, such as quantum mechanical oscillators, may also be used to store quantum information.

SUMMARY

Some aspects are directed to a method of operating an apparatus, the apparatus comprising a first quantum system having a plurality of coherent quantum states, the first quantum system being coupled to a second quantum system, the method comprising providing an input energy signal to the second quantum system that stimulates energy transfer between the first quantum system and the second quantum system and that causes net dissipation of energy to be output from the second quantum system, wherein the input energy signal includes at least two components having different frequencies and each having an amplitude and a phase, and adiabatically varying the amplitude and the phase of the at least two components of the input energy signal to cause a change in one or more of the plurality of coherent quantum states of the first quantum system.

According to some embodiments, the change in the one or more of the plurality of coherent quantum states of the first quantum system is a phase change of a first coherent quantum state of the plurality of coherent quantum states relative to the other coherent quantum states of the plurality of coherent quantum states.

According to some embodiments, the change in the one or more of the plurality of coherent quantum states of the first quantum system is a population transfer between a second coherent quantum state of the plurality of coherent quantum states and a third coherent quantum state of the plurality of coherent quantum states.

According to some embodiments, said adiabatic variation of the amplitude and the phase of the at least two components of the input energy signal is performed such that each of the amplitude and the phase of each of the at least two components of the input energy signal has the same initial and final value before and after the adiabatic variation.

According to some embodiments, the first quantum system is coupled to the second quantum system via a non-linear element.

According to some embodiments, the non-linear element is a Josephson junction.

According to some embodiments, the first quantum system is a first resonant cavity, the second quantum system is a second resonant cavity, the input energy signal is an input photon signal, and said energy transfer between the first quantum system and the second quantum system comprises photon conversion between the first quantum system and the second quantum system.

According to some embodiments, a quality (Q) factor of the first resonant cavity is greater than a Q-factor of the second resonant cavity.

According to some embodiments, a first component of the input photon signal has a first frequency and a second component of the input photon signal has a second frequency, and wherein a difference between the first frequency and the second frequency is equal to a resonant frequency of the first resonant cavity.

According to some embodiments, a third component of the input photon signal has a third frequency equal to a resonant frequency of the second resonant cavity.

According to some embodiments, the photon conversion between the first quantum system and the second quantum system comprises photon conversion from the first quantum system to the second quantum system and photon conversion from the second quantum system to the first quantum system.

According to some embodiments, the photon conversion from the first quantum system to the second quantum system comprises a superposition of two photons of the first quantum system converting to one photon of the second quantum system, and one photon of the first quantum system converting to one photon of the second quantum system.

According to some embodiments, the method further comprises, prior to said providing the input energy, initializing the first quantum system in a superposition of at least two of the plurality of coherent states.

According to some embodiments, the first quantum system has at least three coherent quantum states.

Some aspects are directed to an apparatus comprising a first quantum system having a plurality of coherent quantum states, a second quantum system coupled to the first quantum system, at least one energy source, and at least one controller configured to providing an input energy signal from the at least one energy source to the second quantum system that stimulates energy transfer between the first quantum system and the second quantum system and that causes net dissipation of energy to be output from the second quantum system, wherein the input energy signal includes at least two components having different frequencies and each having an amplitude and a phase, and adiabatically vary the amplitude and the phase of the at least two components of the input energy signal to cause a change in one or more of the plurality of coherent quantum states of the first quantum system.

According to some embodiments, the first quantum system is coupled to the second quantum system via a Josephson junction.

According to some embodiments, the first quantum system is a first resonant cavity, the second quantum system is a second resonant cavity, the at least one energy source is an electromagnetic radiation source, the input energy signal is an input photon signal, and said energy transfer between the first quantum system and the second quantum system comprises photon conversion between the first quantum system and the second quantum system.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Conventional quantum information processing schemes typically couple a number of two-level quantum systems (i.e., "qubits") to encode information. However, quantum information tends to be fragile and susceptible to noise and decoherence processes. Thus, error-correction protocols are sometimes employed with a goal of prolonging the amount of time for which quantum information may be reliably stored.

Some quantum systems utilize a quantum mechanical oscillator or other system having a plurality of coherent states to encode one or more bits of quantum information. Such systems tend to exhibit longer decoherence times than qubits built from, say, Josephson junctions. However, universal control (implementation of arbitrary unitary operations) of such a system can present a challenge due to the conflicting nature of control and decoherence in quantum systems. Controlling a quantum system inherently involves interacting with the system, which can interfere with the coherence of the quantum states of the system. Thus, universal control techniques must find ways to alter coherent states of a quantum system without causing (or significantly contributing to) decoherence of those states.

The inventors have recognized and appreciated that universal control over a superposition of coherent states may be achieved by a particular set of holonomic operations. A holonomic operation is one that is induced upon a state due to adiabatic transport over a closed loop in the state's parameter space. The Aharonov-Bohm effect, in which a phase shift is induced upon a charged particle due to an electromagnetic field despite the particle only being present in locations where no electric or magnetic fields are present, is an example of a holonomic operation.

The inventors have recognized that by arranging a quantum system in a steady state, arbitrary unitary operations may be performed upon coherent states of the quantum system by varying the amount and type of energy input to the system over time. This variation of input energy over time is referred to as a "holonomic gate," as it induces changes in one or more of the coherent states of the quantum system, such as inducing a relative phase to and/or a population change of the one or more states, by performing a closed-loop adiabatic operation.

According to some embodiments, a system may include a first quantum system having a plurality of coherent states coupled to a second quantum system via a non-linear element. Energy may be input to the second quantum system and/or the non-linear element to induce energy transfer from the second quantum system to the first quantum system and/or from the first quantum system to the second quantum system, thereby creating a steady state. The input energy may be adiabatically adjusted over time to induce changes in one or more coherent states of the first quantum system such that the adiabatic process starts and ends at the same position in the phase space of the system (i.e., such that the adiabatic process is a closed loop and thereby may form a holonomic operation).

According to some embodiments, the quantum system may include a resonator cavity. Such cavities may be readily fabricated (e.g., as a microwave cavity) and operated to have a coherent set of states each representing a particular number of photons within the cavity. A cavity may be operated in a steady state by coupling the cavity to a system into which the cavity both dissipates energy (in the form of photons) and receives energy (in the form of photons). This steady state may be modified by adiabatically altering the amount of energy input to the system over time such that a quantum state of the cavity traverses a closed path within phase space. At the end of the path, one or more of the quantum states of the cavity may be changed as a result of the holonomic operation.

As used herein, an "adiabatic" operation refers to a quantum mechanical perturbation that acts upon a quantum system sufficiently slowly that the system remains in its instantaneous eigenstate and there remains a gap between the eigenstate and the rest of the system's spectrum. As discussed above, according to some embodiments, a holonomic gate may be realized by an adiabatic process that forms a closed loop in a quantum system's parameter space (e.g., the system's phase space).

Following below are more detailed descriptions of various concepts related to, and embodiments of, techniques for quantum control of a system having a number of coherent quantum states. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 1:
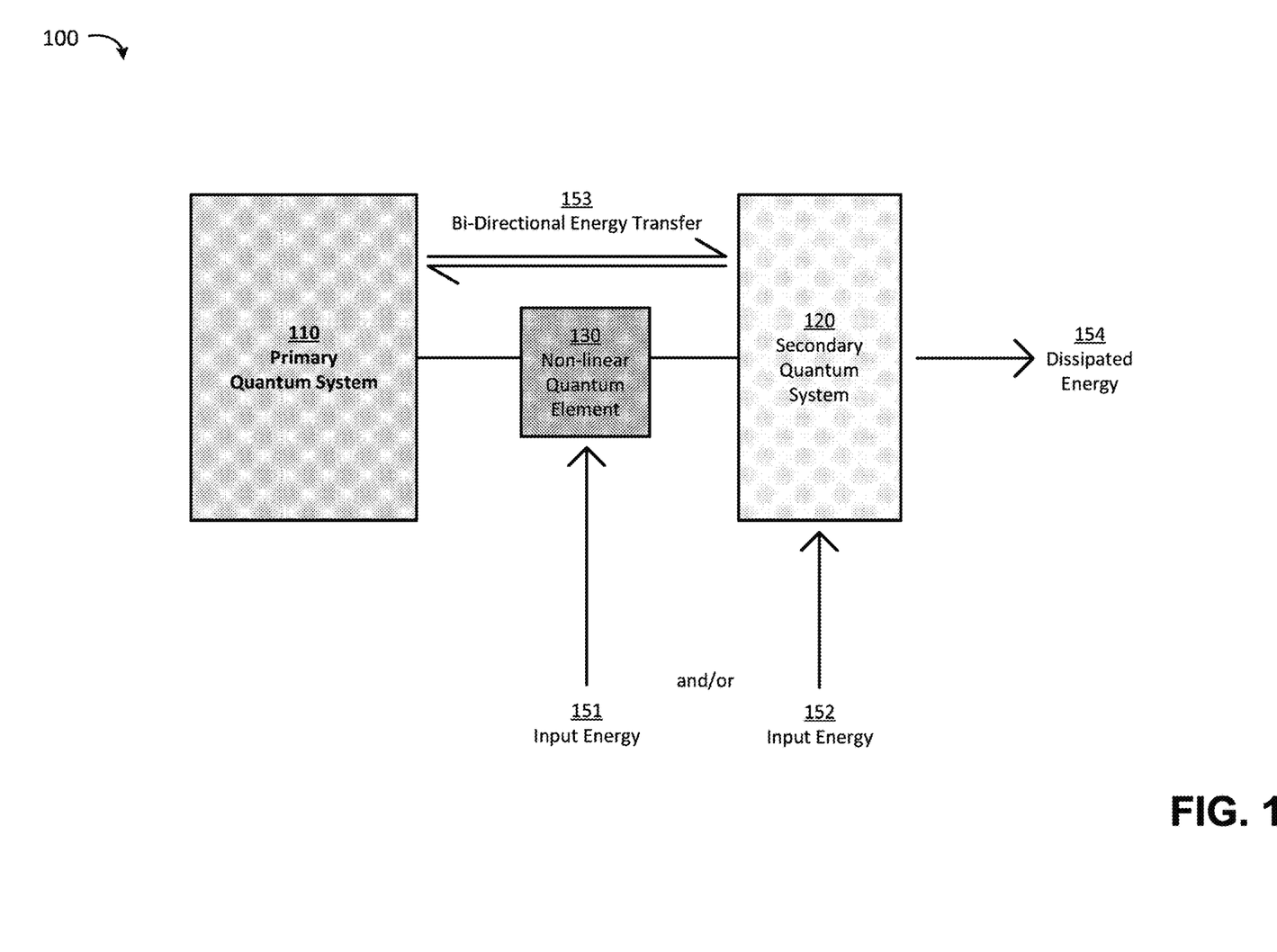
FIG. 1 is a block diagram of an illustrative apparatus suitable for practicing aspects of the invention, according to some embodiments.

FIG. 1 is a block diagram of an illustrative apparatus suitable for practicing aspects of the invention, according to some embodiments. As discussed above, the inventors have recognized that by arranging a quantum system in a particular steady state, to be described below, arbitrary unitary operations may be performed upon coherent states of the quantum system by varying the amount and type of energy input to the system over time. FIG. 1 is an example of a such a system, in which a quantum system 110 is arranged in a steady state.

In the example of FIG. 1, quantum system 110 is labeled as the "primary" quantum system purely to identify it as the system upon which arbitrary unitary operations may be performed. That is, system 100 is configured to allow universal quantum control over coherent quantum states of the primary quantum system 110. The other components in system 100 are provided to enable said control over the states of the primary quantum system 110.

In system 100, input energy is provided either to one of the non-linear quantum element 130 or secondary quantum system 120, or to both the non-linear quantum element 130 and secondary quantum system via input energy 151 and/or input energy 152. The secondary quantum system 120 may be configured to be lossy so that some energy 154 dissipates from the system. In system 100, the non-linear quantum element 130 provides a non-linear coupling between the primary quantum system 110 and the secondary quantum system 120.

Irrespective of which of input energy 151 and/or input energy 152 is provided, the input energy may drive the secondary quantum system 120 and/or the non-linear quantum element 130 to induce energy transfer from the primary quantum system 110 to the secondary quantum system 120, and to induce energy transfer from the secondary quantum system 120 to the primary quantum system 110. These energy transfers are shown in the figure as bi-directional energy transfer 153. The input energy to system 100 (whether 151 and/or 152) may include any suitable energy to stimulate the bi-directional energy transfer 153, and may stimulate multiple energy transfer processes in either direction, including stimulation of superpositions of states within the primary quantum system.

According to some embodiments, input energy (whether 151 and/or 152) may include multiple energetic components that each have different energy amplitudes, frequencies and/or particle compositions, etc. For instance, an input energy (whether 151 and/or 152) may comprise a first signal at a first frequency with a first amplitude and first phase and a second signal at a second frequency, different from the first frequency, with a second amplitude and second phase. This input energy is thus describable with six parameters: two of frequency, two of amplitude, and two of phase, any of which may be varied over time as the energy is input.

System 100 may be operated to perform universal control of coherent states of the primary quantum system 110 in the following manner. First, suitable input energy (whether 151 and/or 152) may be selected so as to induce the bi-directional energy transfer 153 and to cause dissipation of energy 154 such that a steady state is produced within system 100. That is, in the steady state for a given input energy (whether 151 and/or 152), the net energy transfer 153 and dissipated energy 154 are substantially constant over time (notwithstanding the possibility of an initial relaxation period). As discussed above, secondary quantum system 120 may be lossy, and in some embodiments the lossiness (e.g., quality factor, sometimes referred to as the "Q-factor") of the system 120 may be selected so as to produce a desired steady state in combination with the input energy 151 and/or 152.

Once a steady state has been achieved, the input energy (whether 151 and/or 152) may be adjusted over time to adiabatically vary a quantum state of the primary quantum system 110 in phase space over a closed path. For instance, the position and momentum of the quantum state may be varied by adjusting the amplitude and/or phase of energy input to the system (whether input by input energy 151 and/or by input energy 152). Since the quantum state of the primary quantum system 110 is varied adiabatically, this means that the system 100 will be in a steady state at each position in phase space along the path traversed by the quantum state. Also, since the path traversed is a closed path, the result will be a holonomic operation that may, at least for some paths, produce some kind of change in the adiabatically varied quantum state (e.g., phase change, population change, etc.).

While variation of the input energy (whether 151 and/or 152) over time may produce a closed path in phase space of a quantum state of primary quantum system 110, it is not necessarily the case that the input energy (whether 151 and/or 152) be the same at the end of the process as at the beginning of the process. While in some embodiments the input energy (whether 151 and/or 152) may indeed start and end the holonomic operation with the same characteristics, the position of a quantum state of primary quantum system 110 in phase space may not be unique to a particular input energy, and as such the input energy may be different at the end of a holonomic operation than when the operation began. For example, the relative amplitude of components of the input energy (whether 151 and/or 152) may dictate the position in phase space of a quantum state of primary quantum system 110, and as such, adjusting the absolute amplitudes of the components may change during a holonomic operation whilst still producing a closed path in the phase space.

As discussed below, the inventors have recognized and appreciated that certain types of closed paths in phase space may produce quantum state changes, and as such a holonomic operation may be performed by selecting one of these types of paths. In particular, the inventors have recognized that the identified paths (also referred to as "gates") can effect arbitrary unitary operations upon quantum states of a quantum system having any number of coherent quantum states, as discussed further below.

As one example of performing a quantum state change using system 100, primary quantum system 110 may be a qubit system that is in a superposition of a first coherent quantum state and a second coherent quantum state. In some cases, the first quantum state may be modified by causing the first quantum state to adiabatically traverse a closed path in phase space as described above. At the conclusion of the adiabatic path, the first quantum state may have one or more properties that differ from the second quantum state of the system. For instance, there may be a relative phase between the first and second quantum states that was induced by traversal of the adiabatic path. According to some embodiments, a particular quantum state of a multi-quantum state system may be targeted by including an appropriate component of the input energy that allows for manipulation of the particular quantum state without causing manipulation of other quantum states of the system. However, holonomic gates that target multiple quantum states of a quantum system can certainly also be envisioned.

Primary quantum system 110 may include any suitable quantum system that exhibits a number of well-separated coherent states, such as, but not limited to, a microwave cavity or other resonator, a trapped ion, a Rydberg atom, or combinations thereof. Secondary quantum system 120 may include any of these illustrative quantum systems or other suitable quantum systems, and may not necessarily be the same type of quantum system as primary quantum system 110. According to some embodiments, secondary quantum system 120 may be of the same type of quantum system as primary quantum system 110 but may have different physical characteristics (e.g., the two systems may be resonators with different resonant frequencies or different quality factors).

According to some embodiments, the primary quantum system 110 and the secondary quantum system 120 may be bosonic systems. In such cases, input energy 151 and/or input energy 152 may comprise a bosonic energy source, such as one that provides photons or other types of bosons as input.

Non-linear quantum element 130 may be any quantum element that provides a non-linear coupling between primary quantum system 110 and secondary quantum system 120. According to some embodiments, non-linear quantum element 130 may comprise a Josephson junction.

Figure 2:
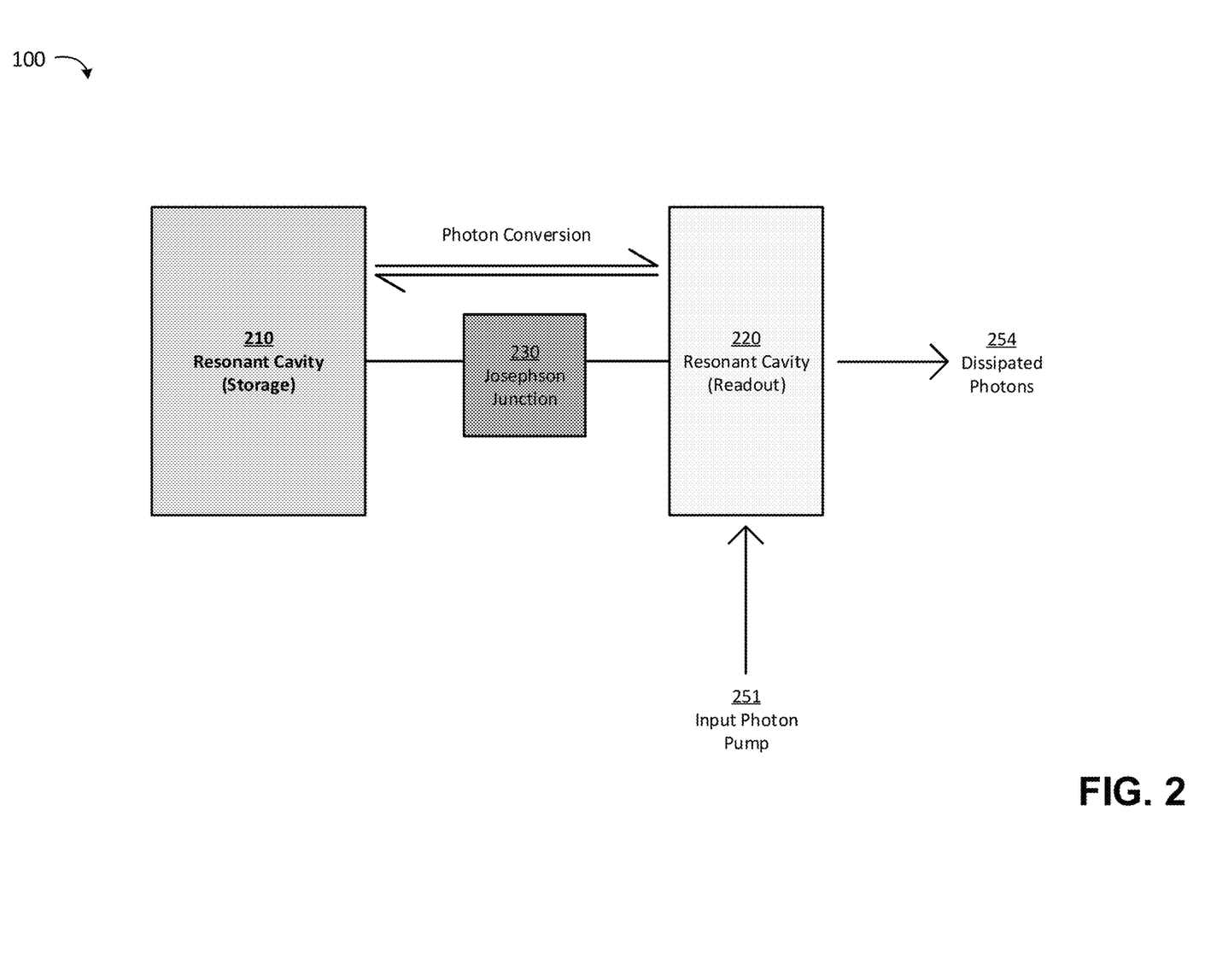
FIG. 2 is a block diagram of a pair of resonant cavities which may be operated to perform universal control of coherent states of one of the resonant cavities, according to some embodiments.

To illustrate a particular physical apparatus that may be operated in accordance with the above-described system 100 shown in FIG. 1, FIG. 2 illustrates a pair of resonant cavities which may be operated to perform universal control of coherent states of one of the resonant cavities, according to some embodiments. As discussed above, embodiments of the present application are not limited to particular types of physical implementations, and are not limited to the use of resonant cavities, and accordingly the example of FIG. 2 is provided merely to illustrate one possible implementation.

System 200 includes a resonant cavity 210 on which arbitrary unitary operations may be performed, and a resonant cavity 220 to which an input photon signal 251 is provided. Cavity 210 is labeled as a "storage" cavity in FIG. 2 to contrast it with cavity 220, since generally the length of coherence times of the quantum states of cavity 210 may be higher that the coherence times of quantum states of cavity 220 (labeled as a "readout" cavity). For instance, cavity 210 may have a higher Q value than cavity 220, which as discussed above and as shown in FIG. 2, dissipates energy 254 in the form of photons (e.g., via a transmission line coupled to the resonant cavity 220, not shown in the figure).

Due to input photon pump 251, which may comprise any number of component signals (sometimes referred to as "tones"), conversion of photons from cavity 210 to cavity 220, and vice versa, may be stimulated. The conversion may include any number and any suitable types of conversions, which may each involve any number of photons, so long as the system 200 can be driven to a steady state. While in the example of FIG. 2, an input photon signal is provided only to resonant cavity 220, it will be appreciated that the signal may drive the resonant cavity 220 and/or may drive the Josephson junction 230 via its coupling to the resonant cavity 220. That is, while the photon energy may be input to the resonant cavity 220, this does not necessarily imply that only the resonant cavity 220 alone may be driven by the input photon energy.

System 200 may be operated to produce arbitrary unitary operations on quantum states of the resonant cavity 210 by varying one or more components of the input photon pump signal 251 over time so as to cause a quantum state of the resonant cavity 210 to traverse a closed path in the quantum state's phase space. To provide an illustrative example of how this may be performed in practice in the system of FIG. 2, FIG. 3 depicts an illustrative steady state of system 200, according to some embodiments.

Figure 3:
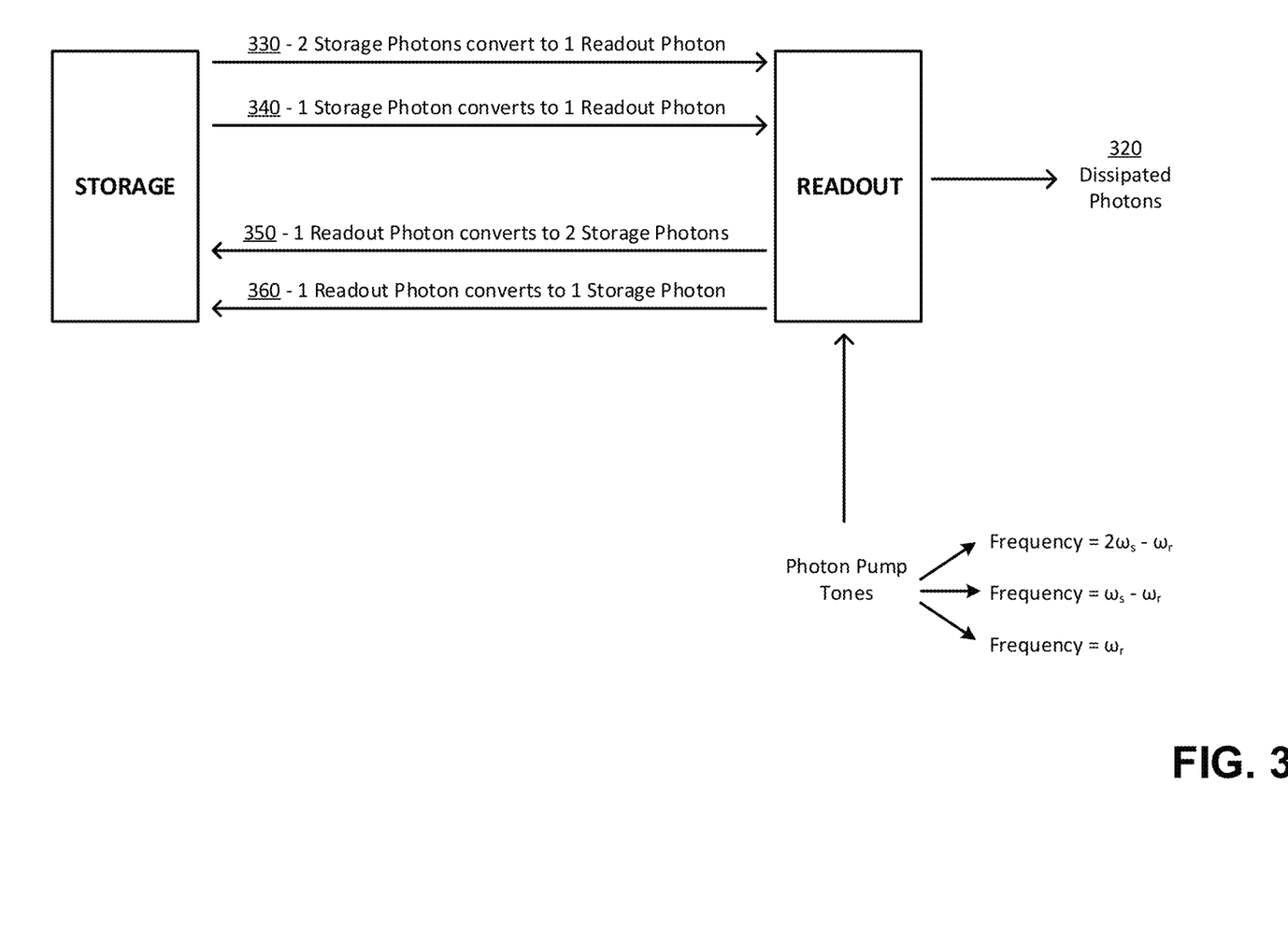
FIG. 3 depicts an illustrative steady state in which the system of FIG. 2 may be operated, according to some embodiments.

In the example of FIG. 3, the various photon energy transfer processes are shown for one possible steady state of the system 200 shown in FIG. 2. In the example of FIG. 3, the photon pump input comprises photons at three different frequencies: $2\omega_s-\omega_r$; $\omega_s-\omega_r$; and $\omega_r$, where $\omega_s$ and $\omega_r$ are angular frequencies of the relevant cavity mode of the storage and readout cavities, respectively. In some embodiments, such modes may be transverse electromagnetic (TEM) modes of the respective cavities. These frequencies are selected to stimulate conversion processes of photons from the storage cavity to the readout cavity, and vice versa.

In particular, the photons at a frequency $2\omega_s-\omega_r$ stimulate the conversion 330 of two photons from the storage cavity into one photon in the readout cavity, and stimulate the conversion 350 of one photon in the readout cavity into two photons in the storage cavity. In addition, the photons at a frequency $\omega_s-\omega_r$ stimulate the conversion 340 of one photon from the storage cavity into one photon in the readout cavity, and stimulate the conversion 360 of one photon in the readout cavity into one photon in the storage cavity. In practice, since both of these frequency components may be present in the photon pump input, the change in the state of the storage and readout cavities due to these conversion processes may be a superposition of the combination of conversions 330 and 340, or of a superposition of the combination of conversions 350 and 360.

In addition to these processes, photons 320 are also dissipated from the readout cavity. The component of the photon pump at frequency $\omega_r$ is provided to introduce an asymmetry to the process with respect to the two types of photon conversion (2↔1, or 1↔1), and may thereby allow for manipulation of one of the quantum states of the storage cavity without altering other quantum states of the cavity via the adiabatic process described above.

In the example of FIG. 3, the photon pump input is describable with six parameters in addition to the three frequency values, specifically the amplitude and phase of each frequency component. According to some embodiments, a holonomic operation may be performed upon a quantum state of the storage cavity by keeping the frequencies of the three illustrative pump tones of FIG. 3 fixed and by varying one or more of the amplitude and phase of the three pump tones. The relative change of the amplitudes and phases of the three tones may cause a change in the phase space position of one quantum state of the storage cavity whilst other quantum states remain unchanged. If the variation of the amplitude and phase of one or more of the three pump tones is performed adiabatically such that the system remains in steady states throughout the process, and if the change in the phase space position is a closed path, the quantum state of the storage cavity may be adjusted with an arbitrary unitary operation, thus providing universal quantum computation over the quantum state of the storage cavity.

As discussed above, the inventors have recognized and appreciated that particular classes of closed paths in phase space may be traversed in the above manner to produce arbitrary unitary operations upon quantum states. FIGS. 4A-4D, 5A-5B and 6A-6B depict these paths for particular illustrative quantum systems, although as discussed below the techniques described may be extended to any quantum system having any number of coherent quantum states.

The following discussion provides a theoretical basis for the above-discussed procedures and systems, and applies to both the illustrative systems shown in FIG. 1 and in FIG. 2, as well as any other suitable systems consistent with the above discussion.

Consider the single-mode d-photon process whose Lindblad Master Equation (LME) is:

$$\dot{\rho} = F\rho F^\dagger - \tfrac{1}{2}\{F^\dagger F, \rho\} \text{ with } F = \Pi_{\nu=0}^{d-1}(\hat{a} - \alpha_\nu), \quad \text{(Eqn. 1)}$$

where $[\hat{a}, \hat{a}^\dagger] = 1$, $\hat{n} = \hat{a}^\dagger \hat{a}$, $\alpha_\nu \in \mathbb{C}$ and $\rho$ a density matrix. The d=1 case (F=$\hat{a} - \alpha_0$) reduces to the well-known driven damped harmonic oscillator whose unique steady state is the coherent state $|\alpha_0\rangle$ (with $\hat{a}|\alpha_0\rangle = \alpha_0|\alpha_0\rangle$). Variants of the d=2 case of Eqn. 1 are manifest in driven 2-photon absorption, the degenerate parametric oscillator, or a laser-driven trapped ion. For arbitrary d and certain $\alpha_\nu$, a qudit steady state space is spanned by the d well-separated coherent states $|\alpha_\nu\rangle$ that are annihilated by F.

As discussed below, universal quantum computation on this qudit can be performed via two gate types, loop gates and collision gates, which rely on adiabatic variation of the parameters $\alpha_\nu(t)$. Each of these two broad classes of paths in phase space (referred to in the subsequent discussion as "gates") may be implemented to perform unitary operations on quantum states of a quantum system as described above in relation to FIGS. 1-3.

In the two photon case, d=2 and we let $\alpha_0$, $\alpha_1$ depend on time in Eq. (1), so the steady-state space holds a qubit. The positions of the qubit's two states $|\alpha_\nu(t)\rangle$ in phase space are each controlled by a tunable parameter. We let $\alpha_0(0) = -\alpha_1(0) \equiv \alpha$ (with $\alpha$ real unless stated otherwise). This system's steady states $|\pm\alpha\rangle$ are the starting point of parameter space evolution for this section.

Figure 4A:
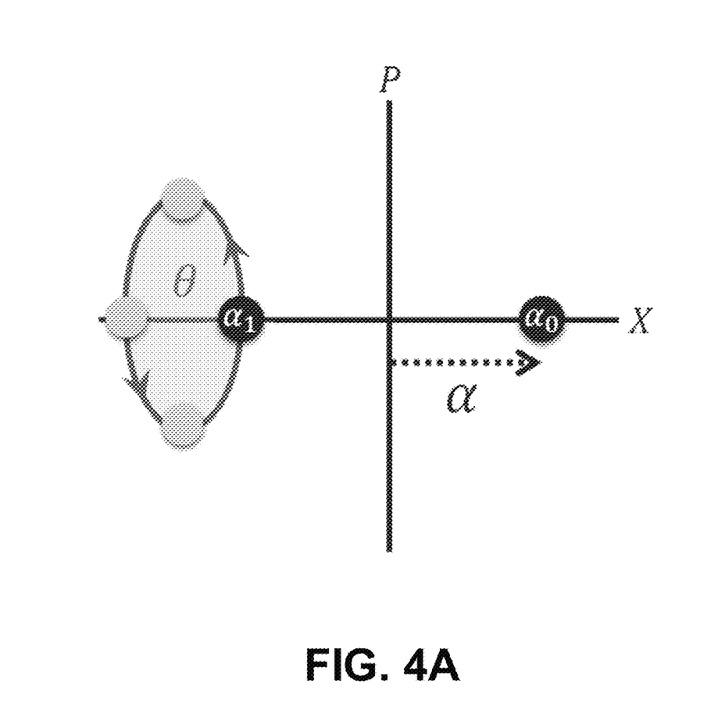
FIGS. 4A-4B illustrate a first class of holonomic operations that may be performed on single qubits, according to some embodiments.

The "loop gate" involves an adiabatic variation of $\alpha_1(t)$ through a closed path in phase space, as shown in FIG. 4A. The state $|\alpha_1(t)\rangle$ is manipulated to follow the path shown and, as long as the path is well separated from $|\alpha_0(t)\rangle = |\alpha\rangle$, this will cause the state to pick up a phase $\theta = 2A$, with A being the area enclosed by the path. It should be clear that initializing the qubit in $|-\alpha\rangle$ will produce only an irrelevant absolute phase upon application of the gate (similar to the d=1 case). However, once the qubit is initialized in a superposition of the two coherent states with coefficients $c_\pm$, the gate will impart a relative phase:

$$c_+|\alpha\rangle + c_-|-\alpha\rangle \to c_+|\alpha\rangle + c_-e^{i\theta}|-\alpha\rangle \quad \text{(Eqn. 2)}$$

Figure 4B:
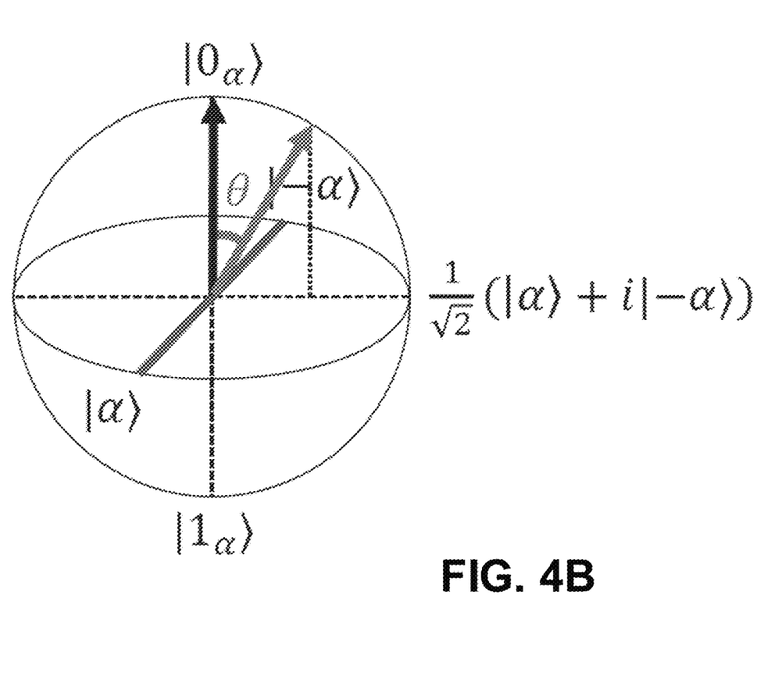

Hence, if we pick $|\alpha\rangle$ to be the x-axis of the $|\pm\alpha\rangle$ qubit Bloch sphere, this gate can be thought of as a rotation around that axis (depicted in FIG. 4B). Similarly, adiabatically traversing a closed and isolated path with the other state parameter $|\alpha_0(t)\rangle$ will induce a phase on $|\alpha\rangle$.

Therefore, the loop gate shown in FIG. 4A represents one way to adjust the quantum state $\alpha_1(t)$ by traversing a closed path in phase space as discussed above. For instance, by adiabatically varying the amplitude and/or phase of the input pump tones shown in FIG. 3 within the system 200 of FIG. 2, the state $\alpha_1(t)$ may be adiabatically adjusted in this manner, leading to a holonomic operation in which the quantum state $\alpha_1(t)$ has a relative phase $\theta$ imparted to it around one axis of the quantum state's Bloch sphere (FIG. 4B).

We now introduce the remaining Bloch sphere components of the qubit. For $\alpha=0$, the d=2 case retains its qubit steady-state space, which includes Fock states $|\mu\rangle$, $\mu=0,1$ (since $F=\hat{a}^2$ annihilates both). One may have noticed that both states $|\pm\alpha\rangle$ go to $|0\rangle$ in the $\alpha \to 0$ limit and do not reproduce the $\alpha=0$ steady state basis. This issue is resolved by introducing the "cat state" basis:

$$|\mu_\alpha\rangle \equiv \frac{e^{-\frac{1}{2}\alpha^2}}{\mathcal{N}_\mu} \sum_{n=0}^\infty \frac{\alpha^{2n+\mu}}{\sqrt{(2n+\mu)!}}|2n+\mu\rangle \xrightarrow{\alpha\to\infty} \frac{1}{\sqrt{2}}(|\alpha\rangle + (-)^\mu|-\alpha\rangle) \quad \text{(Eqn. 3)}$$

with normalization $\mathcal{N}_\mu = \sqrt{\tfrac{1}{2}[1+(-)^\mu\exp(-2\alpha^2)]}$. For $\alpha \to 0$, $|\mu_\alpha\rangle \to |\mu\rangle$ while for $\alpha \to \infty$, the cat states (exponentially) quickly become "macroscopic" superpositions of $|\pm\alpha\rangle$. This problem thus has only two distinct parameter regimes: one in which coherent states come together ($\alpha \ll 1$) and one in which they are far apart ($\alpha \gg 1$, or more practically $\alpha \gtrsim 2$ for d=2). Eqn. (3) shows that (for large enough $\alpha$) cat states and coherent states become conjugate z- and x-bases respectively, forming a well-defined qubit.

We utilize the $\alpha=0$ regime to perform rotations around the Bloch sphere z-axis (the vertically depicted axis of the Bloch sphere shown in FIG. 4D), which effectively induce a collision and population transfer between $|\alpha\rangle$ and $|-\alpha\rangle$. Accordingly, this type of gate is termed a "collision gate."

Figure 4C:
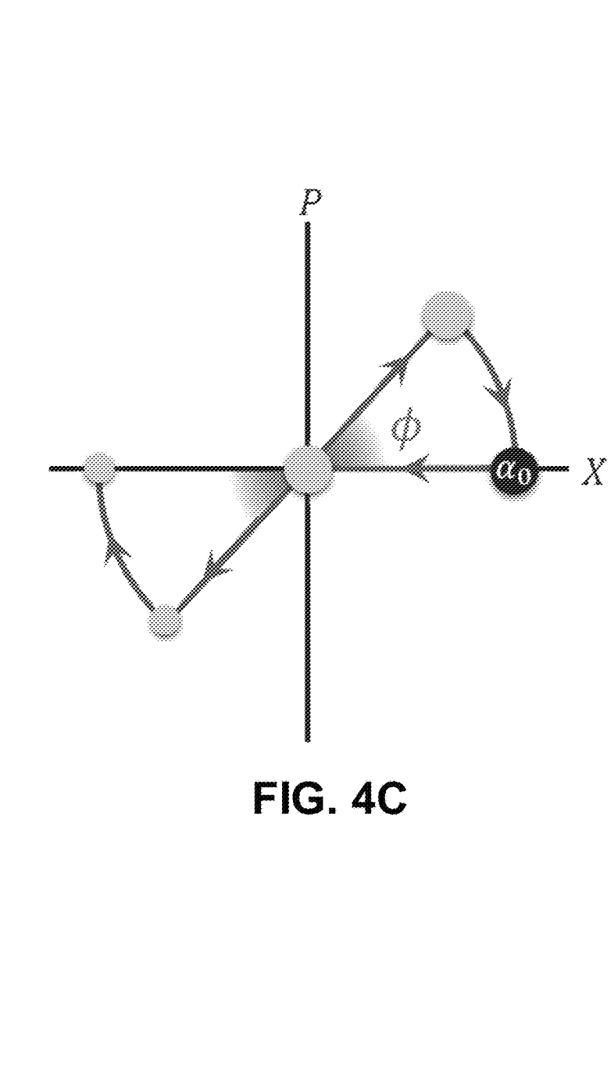
FIGS. 4C-4D illustrate a second class of holonomic operations that may be performed on single qubits, according to some embodiments.
Figure 4D:
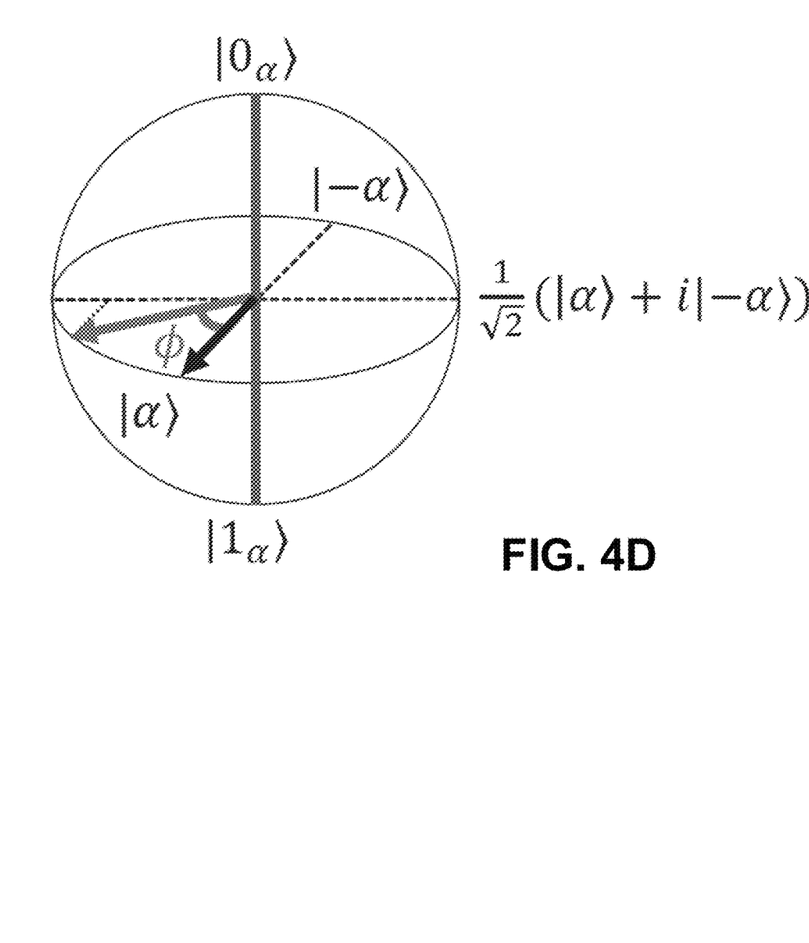

The phase space path of the illustrative collision gate depicted in FIG. 4C is based upon the following observation: applying a bosonic rotation $R_\phi \equiv \exp(i\phi\hat{n})$ to well-separated coherent or cat state superpositions does not induce state-dependent phases, while applying $R_\phi$ to Fock state superpositions does. Only one tunable parameter $\alpha_0(t) = -\alpha_1(t)$ is necessary here, so $F=\hat{a}^2 - \alpha_0(t)^2$ with $|\alpha_\nu(0)| = \alpha$. The collision gate includes reducing $\alpha$ to 0, pumping back to $\alpha \exp(i\phi)$, and rotating back to $\alpha$ (FIG. 0c). The full gate is thus represented by $R_\phi^\dagger S_\phi S_0^\dagger$, where $S_\phi$ denotes the pumping from 0 to $\alpha \exp(i\phi)$[1]. Since

[1] When acting on status in the Decoherence Free Subspace (DFS), $S_\phi$ can be approximated by a path-ordered product of DFS projectors $P_a = |0_a\rangle\langle 0_a| + |1_a\rangle\langle 1_a|$ with each projector incrementing a:

$$S_\phi \approx P_{\alpha e^{i\phi}} \cdots P_{\frac{2}{M}\alpha e^{i\phi}} P_{\frac{1}{M}\alpha e^{i\phi}}$$

for integer $M \gg 1$. Using Eq. (3), one can show that $P_{\alpha e^{i\phi}} = R_\phi P_\alpha R_\phi^\dagger$ and prove Eq. (4).

$$R_\phi^\dagger S_\phi S_0^\dagger = R_\phi^\dagger (R_\phi S_0 R_\phi^\dagger) S_0^\dagger = S_0 R_\phi^\dagger S_0^\dagger, \quad \text{(Eqn. 4)}$$

the collision gate is equivalent to reducing $\alpha$, applying $R_\phi^\dagger$ on the steady-state basis $|\mu\rangle$, and pumping back to $\alpha$.

The net result is thus a relative phase between the states $|\mu_\alpha\rangle$:

$$c_0|0_\alpha\rangle + c_1|1_\alpha\rangle \to c_0|0_\alpha\rangle + c_1 e^{-i\phi}|1_\alpha\rangle. \quad \text{(Eqn. 5)}$$

In the coherent state basis, this translates to a coherent population transfer between $|\pm\alpha\rangle$.

Figure 5A:
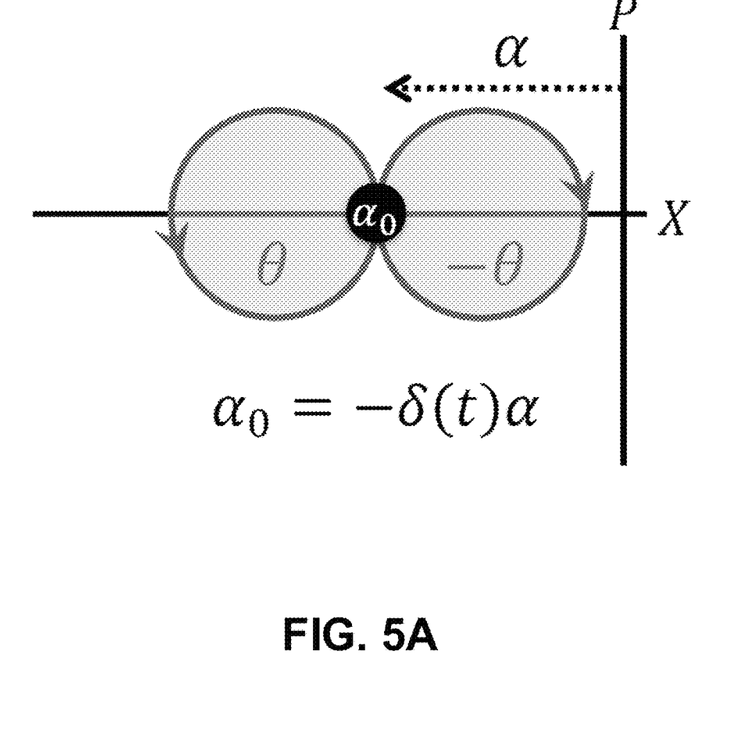
FIGS. 5A-5B illustrate a class of holonomic operations that may be performed on two qubits, according to some embodiments.
Figure 5B:
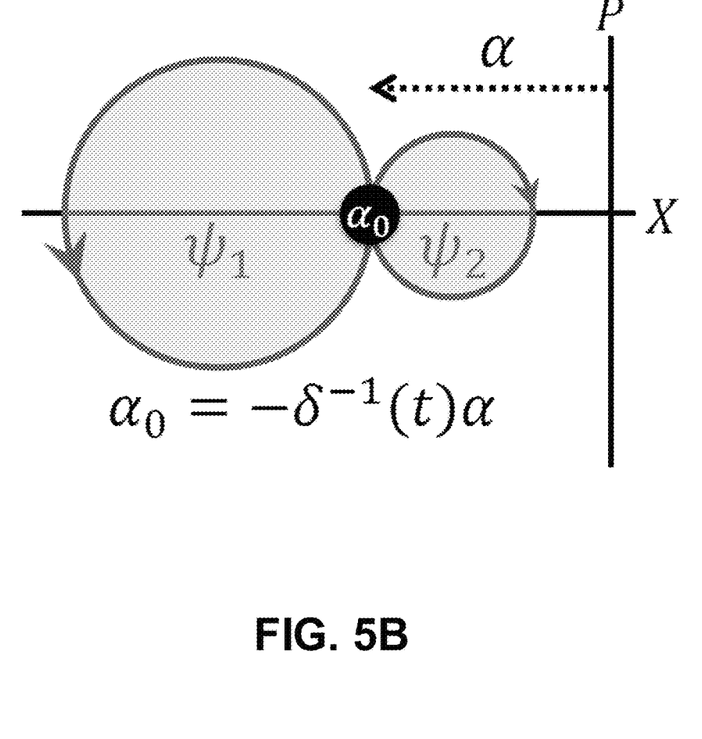

For two-qubit gates, we can add a second mode $\hat{b}$ and, for the 2-photon case, introduce the gate shown in FIGS. 5A-5B, and referred to herein as an "entangling infinity gate." In this case, the two jump operators are used (as opposed to use of only one in Eqn. 1) and one of the two jump operators consists of lowering operators â, b̂ of both modes:

$$F_I(\hat{a}-\alpha)(\hat{a}+\delta\alpha) \text{ and } F_{II}(\hat{a}\hat{b}-\alpha^2)(\hat{a}\hat{b}+\delta\alpha^2) \quad \text{(Eqn. 6)}$$

We keep $\alpha>0$ constant and vary $\delta(t)$ in a figure-eight or "∞" pattern as shown in FIGS. 5A-5B, starting and ending with $\delta=1$. For $\delta=1$, the four Decoherence Free Subspace (DFS) basis elements $\{|\pm\alpha\rangle\}\otimes\{|\pm\alpha\rangle\}$ are annihilated by both $F_I$ and $F_{II}$. For $\delta\neq 1$, and for sufficiently large $\alpha$, the basis elements become $|\alpha, \alpha\rangle$, $|\alpha, -\delta\alpha\rangle$, $|-\delta\alpha, \alpha\rangle$ and $|-\delta\alpha, -\delta^{-1}\alpha\rangle$. Notice that the $\delta^{-1}$ makes sure that $F_{II}|-\delta\alpha, -\delta^{-1}\alpha\rangle=0$. This $\delta^{-1}$ allows the fourth state to gain a Berry phase distinct from the other three states. Since Berry phases of different modes add, we analyze the â/b̂-mode contributions individually.

For any state which contains the $|-\delta\alpha\rangle$ component (in either mode), the Berry phase gained for each of the two circles shown in either FIG. 5A or FIG. 5B is proportional to their areas. Since, in the example of FIG. 5A, the oppositely oriented circles have the same area, these phases will cancel. The Berry phase of the fourth state, which contains the component $|-\delta^{-1}\alpha\rangle$, will be proportional to the total area enclosed by the path made by $\delta^{-1}$. As shown in FIG. 5B, inversion maps circles to circles, but the two inverted circles shown will now have different areas. Summing the Berry phases $\psi_i$ gained upon traversal of the two circles $i \in \{1,2\}$ yields an effective phase gate:

$$|-\alpha, -\alpha\rangle + |rest\rangle \rightarrow e^{i(\psi_1+\psi_2)}|-\alpha, -\alpha\rangle + |rest\rangle \quad \text{(Eqn. 7)}$$

where $|rest\rangle$ is the unaffected superposition of the remaining components $|\alpha, \alpha\rangle$, $|\alpha, -\alpha\rangle$, $-\alpha, \alpha\rangle$.

Finally, we outline the system and its single mode gates for arbitrary values of d; that is, for performing holonomic operations upon any suitable quantum system having d coherent quantum states.

Figure 6A:
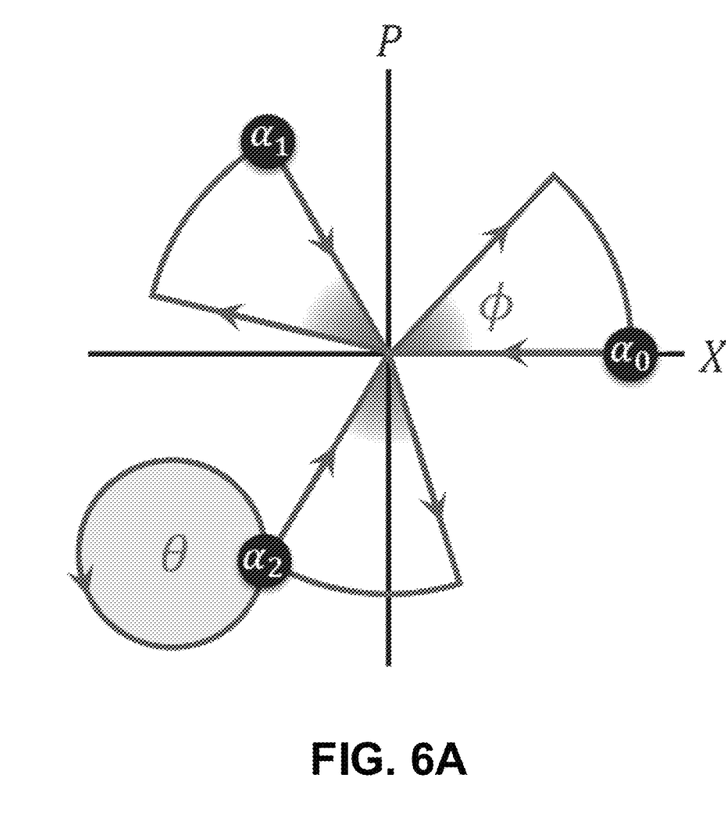
FIGS. 6A-6B illustrate a class of holonomic operations that may be performed on systems having more than two coherent quantum states, according to some embodiments.

Here, we let $\alpha_v(0)\equiv\alpha e_v$ with real non-negative $\alpha$, $$e_v \equiv \exp\left(i\frac{2\pi}{d}v\right),$$

and $v=0,1, \ldots, d-1$. For large enough $\alpha$, the steady-state qudit includes d well-separated coherent states $|\alpha e_v\rangle$ of mean photon number $\alpha^2$ evenly distributed around a circle in phase space (see FIG. 6A illustrating the case for d=3). This illustrative choice of initial qudit configuration makes Eqn. (1) invariant under the discrete rotation exp $$\left(i\frac{2\pi}{d}\hat{n}\right)$$

and is a bosonic analogue of a particle on a discrete ring. Therefore, n̂ mod d is a good quantum number and we can distinguish eigenspaces of $$\exp\left(i\frac{2\pi}{d}\hat{n}\right)$$

by projectors:

$$\Pi_\mu = \sum_{n=0}^{\infty}|dn+\mu\rangle\langle dn+\mu| = \frac{1}{d}\sum_{v=0}^{d-1}\exp\left[i\frac{2\pi}{d}(\hat{n}-\mu)v\right] \quad \text{(Eqn. 8)}$$

with $\mu=0,1,\ldots,d-1$. The corresponding cat-state basis generalizes Eqn. (3) to $$|\mu_\alpha\rangle \equiv \frac{\Pi_\mu|\alpha\rangle}{\sqrt{\langle\alpha|\Pi_\mu|\alpha\rangle}} \rightarrow \begin{cases} |\mu\rangle & \alpha\rightarrow 0 \\ \frac{1}{\sqrt{d}}\sum_{v=0}^{d-1}e^{-i\frac{2\pi}{d}\mu v}|\alpha e_v\rangle & \alpha\rightarrow\infty \end{cases}.$$

Since overlap between coherent states decays exponentially with $\alpha$, the quantum Fourier transform between coherent states $|\alpha e_v\rangle$ and cat states $|\mu_\alpha\rangle$ in Eqn. (2) valid in the well-separated regime, i.e., when $$2\alpha\sin\frac{\pi}{d} \gg 1$$

(satisfied when $|\langle\alpha|\alpha e_1\rangle|^2 \ll 1$). It should be clear that the more coherent states there are (larger d), the more one has to pump to resolve them (larger $\alpha$). Also note the proper convergence to Fock states $|\mu\rangle$ as $\alpha\rightarrow 0$ in Eqn. (2).

Both the loop and collision gates described above for the d=2 case above generalize straightforwardly for arbitrary values of d (see FIG. 6A for d=3). The phase gate includes adiabatic evolution of a specific $\alpha_v(t)$ around a closed path that is isolated from all other $\alpha_{v'}(0)$. There are d such possible evolutions, each imparting a phase on its respective $|\alpha e_v\rangle$. The collision gate is performed as follows: starting with the $|\alpha e_v\rangle$ configuration for large enough $\alpha$, tune $\alpha$ to zero (or close to zero), pump back to a different phase $\alpha\exp(i\phi)$, and rotate back to the initial configuration. Each $|\mu_\alpha\rangle$ will gain a phase proportional to $$\phi\langle\mu_\alpha|\hat{n}|\mu_\alpha\rangle \xrightarrow{\alpha\rightarrow 0} \phi\mu.$$

Figure 6B:
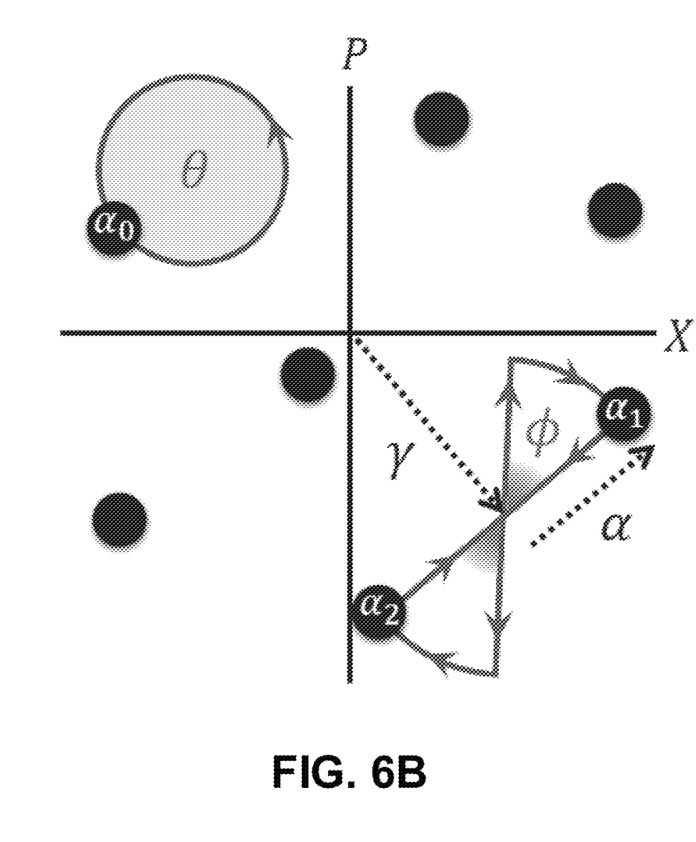

Equivalently, this gate induces transitions between $|\alpha e_v\rangle$. FIG. 6B illustrates an arbitrary configuration of steady states of a quantum system for d=7, depicting $|\alpha_0\rangle$ undergoing a loop gate and $|\alpha_1\rangle$, $|\alpha_2\rangle$ undergoing a collision gate (colliding at a position displaced from the origin).

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating an apparatus, the apparatus comprising a first quantum system having a plurality of coherent quantum states, the first quantum system being coupled to a second quantum system, the method comprising:
   providing to the second quantum system an input energy signal that stimulates energy transfer between the first quantum system and the second quantum system and that causes net dissipation of energy to be output from the second quantum system, wherein the input energy signal includes at least two components having different frequencies, each component having an amplitude and a phase; and
   adiabatically varying the amplitude and the phase of the at least two components of the input energy signal provided to the second quantum system to cause a change in at least one of the plurality of coherent quantum states of the first quantum system.

2. The method of claim 1, wherein the change in one or more of the plurality of coherent quantum states of the first quantum system is a phase change of a first coherent quantum state of the plurality of coherent quantum states relative to the other coherent quantum states of the plurality of coherent quantum states.

3. The method of claim 1, wherein the change in one or more of the plurality of coherent quantum states of the first quantum system is a population transfer between a second coherent quantum state of the plurality of coherent quantum states and a third coherent quantum state of the plurality of coherent quantum states.

4. The method of claim 1, wherein said adiabatic variation of the amplitude and the phase of the at least two components of the input energy signal is performed such that each of the amplitude and the phase of each of the at least two components of the input energy signal has the same initial and final value before and after the adiabatic variation.

5. The method of claim 1, wherein the first quantum system is coupled to the second quantum system via a non-linear element.

6. The method of claim 5, wherein the non-linear element is a Josephson junction.

7. The method of claim 1, wherein:
   the first quantum system is a first resonant cavity,
   the second quantum system is a second resonant cavity,
   the input energy signal is an input photon signal, and
   said energy transfer between the first quantum system and the second quantum system comprises photon conversion between the first quantum system and the second quantum system.

8. The method of claim 7, wherein a quality (Q) factor of the first resonant cavity is greater than a Q-factor of the second resonant cavity.

9. The method of claim 7, wherein a first component of the input photon signal has a first frequency and a second component of the input photon signal has a second frequency, and wherein a difference between the first frequency and the second frequency is equal to a resonant frequency of the first resonant cavity.

10. The method of claim 7, wherein a third component of the input photon signal has a third frequency equal to a resonant frequency of the second resonant cavity.

11. The method of claim 7, wherein the photon conversion between the first quantum system and the second quantum system comprises photon conversion from the first quantum system to the second quantum system and photon conversion from the second quantum system to the first quantum system.

12. The method of claim 11, wherein the photon conversion from the first quantum system to the second quantum system comprises a superposition of:
   two photons of the first quantum system converting to one photon of the second quantum system; and
   one photon of the first quantum system converting to one photon of the second quantum system.

13. The method of claim 1, further comprising, prior to said providing the input energy, initializing the first quantum system in a superposition of at least two of the plurality of coherent quantum states.

14. The method of claim 1, wherein the first quantum system has at least three coherent quantum states.

15. An apparatus comprising:
   a first quantum system having a plurality of coherent quantum states;
   a second quantum system coupled to the first quantum system;
   at least one energy source; and
   at least one controller configured to:
      provide an input energy signal from the at least one energy source to the second quantum system that stimulates energy transfer between the first quantum system and the second quantum system and that causes net dissipation of energy to be output from the second quantum system, wherein the input energy signal includes at least two components having different frequencies and each having an amplitude and a phase; and
      adiabatically vary the amplitude and the phase of the at least two components of the input energy signal provided to the second quantum system to cause a change in one or more of the plurality of coherent quantum states of the first quantum system.

16. The apparatus of claim 15, wherein the first quantum system is coupled to the second quantum system via a Josephson junction.

17. The apparatus of claim 15, wherein:
the first quantum system is a first resonant cavity,
the second quantum system is a second resonant cavity,
the at least one energy source is an electromagnetic radiation source,
the input energy signal is an input photon signal, and
said energy transfer between the first quantum system and the second quantum system comprises photon conversion between the first quantum system and the second quantum system.

\* \* \* \* \*

UNITED STATES PATENT AND TRADEMARK OFFICE
CERTIFICATE OF CORRECTION

PATENT NO. : 11,106,991 B2
APPLICATION NO. : 15/553047
DATED : August 31, 2021
INVENTOR(S) : Liang Jiang et al.

Page 1 of 1

It is certified that error appears in the above-identified patent and that said Letters Patent is hereby corrected as shown below:

In the Specification

Column 1, Line 22, in the FEDERALLY SPONSORED RESEARCH section:
"W31P4W-12-1-0017"
Should read:
--W31P4Q-12-1-0017--

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*